United States Patent [19]
Miller

[11] 3,913,871
[45] Oct. 21, 1975

[54] HEAVIER-THAN-AIR PASSENGER AIRCRAFT

[76] Inventor: Ralph H. Miller, 13619 Sunset, Detroit, Mich. 48212

[22] Filed: May 2, 1974

[21] Appl. No.: 466,417

[52] U.S. Cl. ................................................. 244/5
[51] Int. Cl.² ......................................... B64B 1/20
[58] Field of Search .............. 244/5, 13, 25, 30, 36, 244/45 R, 2, 15; D12/76

[56] References Cited
UNITED STATES PATENTS

| | | | |
|---|---|---|---|
| 722,516 | 3/1903 | Johnston | 244/25 |
| 1,700,107 | 1/1929 | Pupp | 244/5 |
| 1,777,576 | 10/1930 | Ries | 244/5 |
| D127,158 | 5/1941 | Oliver | D12/76 |
| D188,226 | 6/1960 | Jones et al. | D12/76 |

FOREIGN PATENTS OR APPLICATIONS

| | | | |
|---|---|---|---|
| 1,209,290 | 10/1970 | United Kingdom | 244/36 |

Primary Examiner—Trygve M. Blix
Assistant Examiner—Galen L. Barefoot
Attorney, Agent, or Firm—William L. Fisher, Esq.

[57] ABSTRACT

Improvement in heavier-than-air passenger aircraft having forward thrust engines, wings, a rear fin and rudder, and a lighter-than-air gas lift mechanism for enhancing the aerodynamic lift provided by the forward thrust engines and wings, such improvement comprising respective forward and rear wings, two equally widthwise spaced apart gas compartments containing lighter-than-air gas disposed vertically above the forward wing, a passenger compartment having a pilot compartment at the front end thereof, the passenger compartment disposed vertically above the forward wing and transversely centrally between the gas compartments, the forward and rear wings and the three compartments joined to each other to provide framing rigidity for said aircraft, the rear fin and rudder mounted upon the passenger compartment so as to upstand vertically therefrom to obtain a clear aerodynamic cut into the air, each compartment of substantially uniform transverse cross-section, each compartment extending axially substantially full length of said aircraft, the rear wing being a substantially full width rear wing disposed vertically above the forward wing so as to have a substantially clear aerodynamic cut into the air.

2 Claims, 3 Drawing Figures

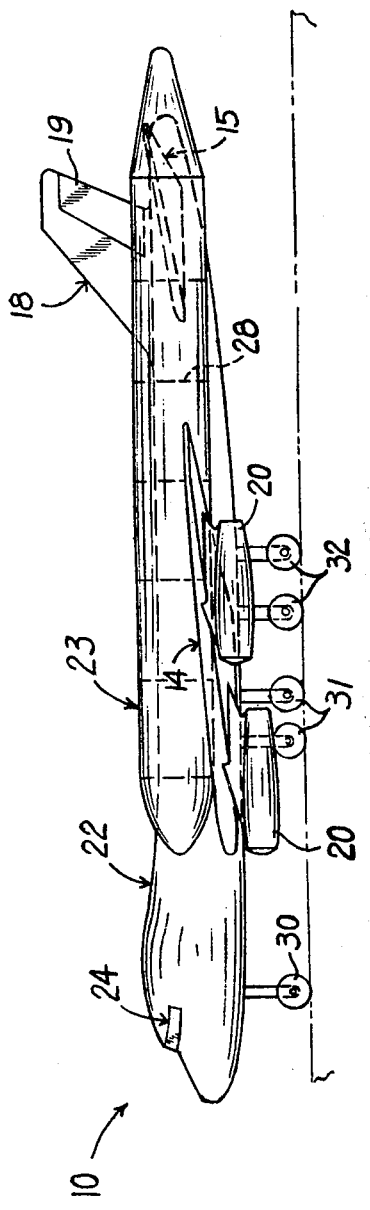
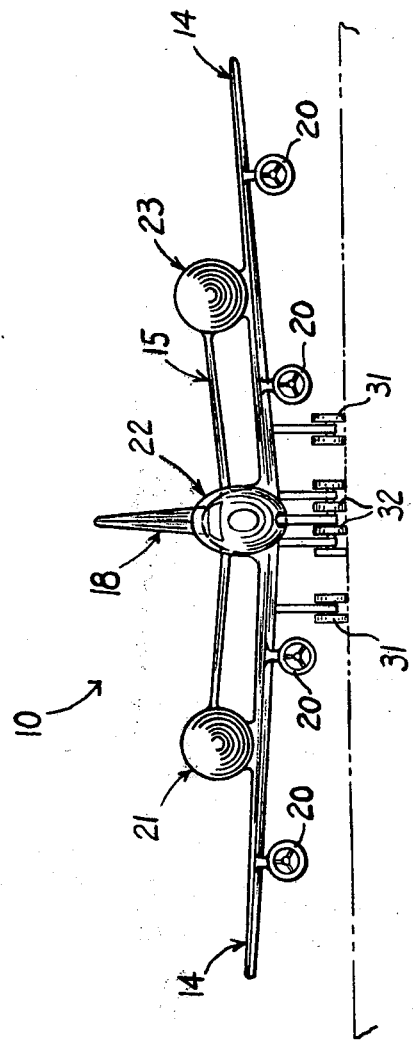

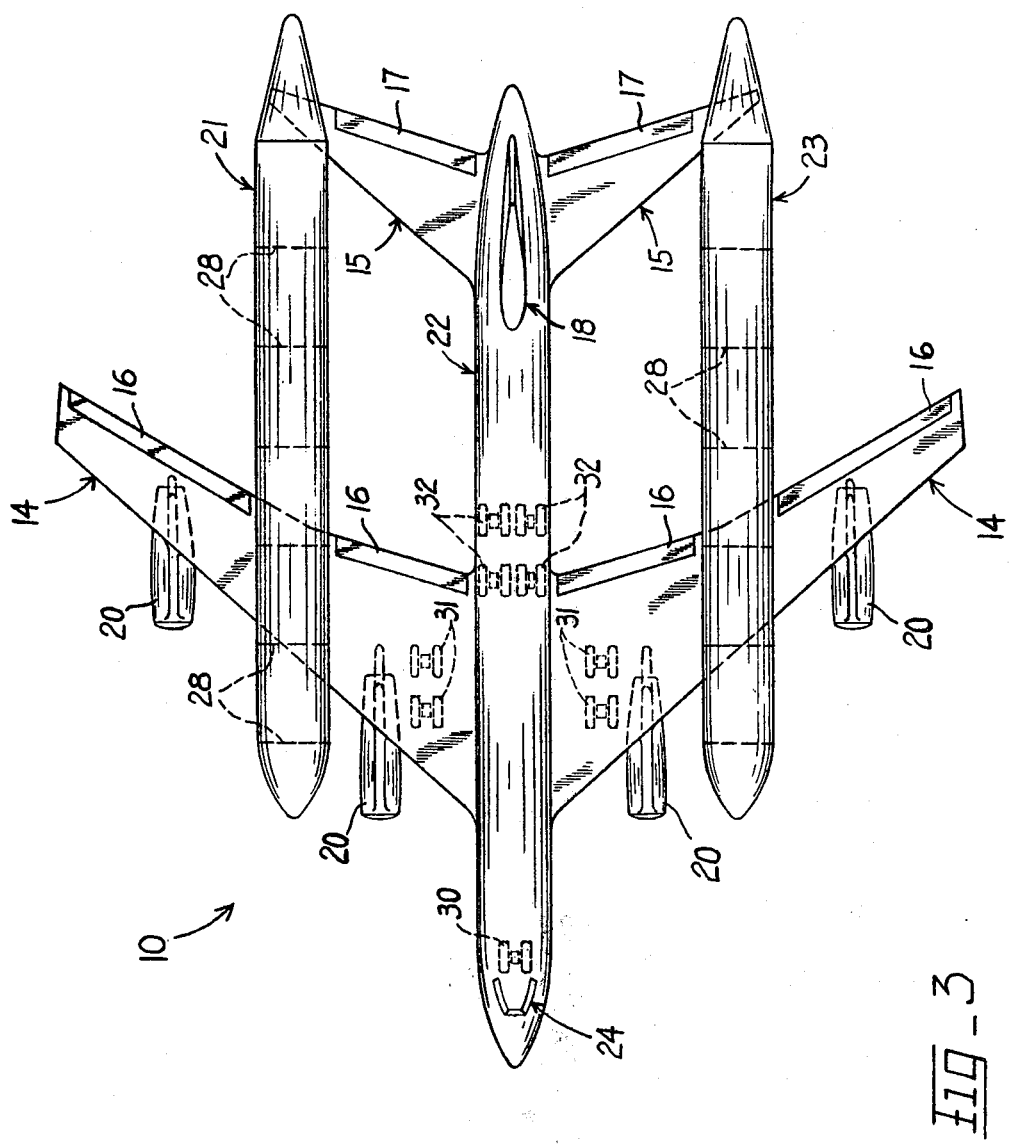

HEAVIER-THAN-AIR PASSENGER AIRCRAFT

My invention relates to heavier-than-air passenger aircraft.

The principal object of my invention is to provide improvements in heavier-than-air passenger aircraft which render said aircraft an effective passenger aircraft capable of safely carrying a large passenger payload, particularly at high speeds.

The foregoing object of my invention and the advantages thereof will become apparent during the course of the following description, taken in conjunction with the accompanying drawings, in which:

FIGS. 1–3 are, respectively, side, front elevational and top plan views of an improved passenger aircraft embodying my invention.

Referring to the drawings in greater detail, 10 generally designates said embodiment which comprises forward and rear full wing means 14 and 15, respectively, having ailerons 16 and elevators 17, respectively. Said embodiment 10 further comprises a rear fin 18, rudder means 19 and two pairs of forward thrust means 20. Said passenger aircraft 10 is provided with three equally widthwise spaced apart compartments means 21, 22 and 23, the two outboard ones, 21 and 23, of which are identical gas compartment means and the center one 22 of which is a passenger compartment means provided with pilot compartment means 24 at the forward end thereof. Each said gas compartment means 21 and 23 is of uniform transverse cross-section and contains lighter-than-air gas, such as helium. Said gas compartment means 21 and 23 must be disposed vertically above said forward wing 14. The framing for said compartment means 21, 22 and 23 is utilized for joining together the framing for said forward and rear wings 14 and 15 to provide framing rigidity for said aircraft. Each said forward thrust means 20, in the instance, is in the form of a conventional jet engine supported on said forward wing 14. Said rear wing 15 is a substantially full width wing disposed vertically above said forward wing 14 so that it has a clear aerodynamic cut into the air. The framing for said center passenger compartment means 22 is used for joining together the framing for said rear fin 18 and rudder means 19. Each said gas compartment means 21 and 23 is provided with lengthwise spaced apart compartment divider means 28 forming interior gas-tight chambers therebetween for containing separate containers for and quantities of helium. The separate helium chambers in each said gas compartment are for balancing the helium lift both lengthwise and widthwise of the aircraft and for safety in case of accidental escape of helium gas. Forward and rear sets of retractable landing gear means 30 and 32, respectively, are made fast to the underside of said passenger compartment means 22 and center sets 31 are made fast to the underside of said forward wing means 14 for use in take-off and landing of said aircraft 10. The gas lift provided by said two gas compartment means 21 and 23, in combination with the aerodynamic lift provided by the forward thrust means 20 and the forward and rear wings 14 and 15, effect a substantial fuel economy in flight and substantially enhance: (a) the take-off and landing flight characteristics of said aircraft 10 making it capable of taking off and landing in shorter distances; (b) the cruising flight characteristics thereof making it a safer aircraft capable of gliding safely to the ground; and (c) the payload-carrying ability thereof making it capable of carrying heavier passenger loads per unit of deadweight.

It will thus be seen that there has been provided by my invention an improved passenger aircraft in which the object hereinabove set forth, together with many thoroughly practical advantages, has been successfully achieved. While a preferred embodiment of my invention has been shown and described, it is to be understood that variations and changes may be resorted to without departing from the spirit of my invention, as defined by the appended claims.

What I claim is:

1. Improvement in heavier-than-air passenger aircraft having forward thrust means, wing means, rear fin and rudder means, and lighter-than-air gas lift means for enhancing the aerodynamic lift provided by said forward thrust means and wing means, said improvement comprising respective forward and rear wing means, two equally widthwise spaced apart gas compartment means containing lighter-than-air gas disposed vertically above said forward wing means, a passenger compartment means having a pilot compartment at the front end thereof, said passenger compartment means disposed vertically above said forward wing means and transversely centrally between said gas compartment means, said forward and rear wing means and said three compartment means joined to each other to provide framing rigidity for said aircraft, said rear fin and rudder means mounted upon said passenger compartment means so as to upstand vertically therefrom to obtain a clear aerodynamic cut into the air, each said compartment means of substantially uniform transverse cross-section, each said compartment means extending axially substantially full length of said aircraft, said rear wing means being a substantially full width rear wing disposed vertically above said forward wing means so as to have a substantially clear aerodynamic cut into the air.

2. Improvement as claimed in claim 1, each said gas compartment means having separate lighter-than-air gas chambers therein for balancing the gas lift both lengthwise and widthwise of the aircraft for safety.

* * * * *